United States Patent
Matsui

[19]
[11] Patent Number: 5,997,022
[45] Date of Patent: Dec. 7, 1999

[54] BICYCLE SUSPENSION ASSEMBLY

[75] Inventor: Hisashi Matsui, Sakai, Japan

[73] Assignee: Shimano Inc., Osaka, Japan

[21] Appl. No.: 08/887,306

[22] Filed: Jul. 2, 1997

[51] Int. Cl.[6] .................................................. B62K 3/02
[52] U.S. Cl. .............................................. 280/284; 280/288
[58] Field of Search .................................... 280/283, 284, 280/285, 286, 288, 275

[56] References Cited

U.S. PATENT DOCUMENTS

| | | | |
|---|---|---|---|
| 1,071,892 | 9/1913 | Diepenhorst et al. | 280/281.1 |
| 1,257,761 | 1/1918 | Strand | 280/281.1 |
| 3,942,821 | 3/1976 | Bock | 280/277 |
| 5,121,937 | 6/1992 | Lawwill | 280/284 |
| 5,205,572 | 4/1993 | Buell et al. | 280/284 |
| 5,217,241 | 6/1993 | Girvin | 280/284 |
| 5,226,674 | 7/1993 | Buell et al. | 280/284 |
| 5,244,224 | 9/1993 | Busby | 280/284 |
| 5,259,636 | 11/1993 | Morales | 280/281.1 |
| 5,259,637 | 11/1993 | Busby | 280/284 |
| 5,284,354 | 2/1994 | McWethy | 280/284 |
| 5,306,036 | 4/1994 | Busby | 280/284 |
| 5,316,327 | 5/1994 | Bell | 280/260 |
| 5,332,246 | 7/1994 | Buell | 280/284 |
| 5,354,085 | 10/1994 | Gally | 280/285 |
| 5,370,411 | 12/1994 | Takamiya et al. | 280/284 |
| 5,385,361 | 1/1995 | De Bei | 280/284 |
| 5,409,249 | 4/1995 | Busby | 280/284 |
| 5,441,292 | 8/1995 | Busby | 280/284 |
| 5,452,910 | 9/1995 | Harris | 280/284 |
| 5,460,396 | 10/1995 | Sutter et al. | 280/284 |
| 5,474,318 | 12/1995 | Castellano | 280/284 |
| 5,498,013 | 3/1996 | Hwang | 280/283 |
| 5,509,679 | 4/1996 | Leitner | 280/284 |
| 5,570,896 | 11/1996 | Collins | 280/284 |
| 5,593,168 | 1/1997 | Chou | 280/275 |
| 5,611,557 | 3/1997 | Farris et al. | 280/275 |

FOREIGN PATENT DOCUMENTS

| | | |
|---|---|---|
| 302878 | 4/1997 | China . |
| 404530A | 12/1990 | European Pat. Off. . |
| 559645 | 9/1923 | France . |
| 723467 | 4/1932 | France . |
| 1061547 | 4/1954 | France . |
| 175976 | 10/1906 | Germany . |
| 4233596 | 7/1994 | Germany . |
| 414870 | 12/1946 | Italy . |
| 8253188 | 10/1996 | Japan . |
| 8258781 | 10/1996 | Japan . |
| 9109973 | 4/1997 | Japan . |
| 9109974 | 4/1997 | Japan . |

*Primary Examiner*—Lanna Mai
*Assistant Examiner*—Andrew J. Fischer
*Attorney, Agent, or Firm*—Shinjyu Global IP Counselors, LLP

[57] ABSTRACT

A suspension assembly for a bicycle frame which elastically supports a rear frame member, which in turn rotatably supports the rear wheel. Preferably, the frame is a two-piece construction with the suspension assembly interconnecting the rear frame to the main frame. The suspension assembly is positioned around the bottom bracket such that the rear frame member pivots about the axis of the bicycle crank axle of the bottom bracket. This arrangement allows the rear wheel and rear frame member to move relative to the main frame, without any adverse affects to the drive train assembly. In the preferred embodiments, drive train assembly can be either a chain drive or a shaft drive. The suspension assembly includes an inner suspension member with the crank axle mounted therein and an outer suspension member surrounding the inner suspension member with a shock absorbing element interposed therebetween. In the preferred embodiment, the shock absorbing element includes a plurality of biasing members.

15 Claims, 14 Drawing Sheets

BICYCLE SUSPENSION ASSEMBLY

FIELD OF THE INVENTION

The present invention generally relates to a rear suspension assembly for a bicycle. More specifically, the present invention relates to a rear suspension assembly for elastically coupling the rear frame member to the main frame member such that the rear frame member pivots about the bottom bracket.

BACKGROUND OF THE INVENTION

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In the past, most bicycles had rigid frames which typically transmitted the shocks resulting from rough riding surfaces directly to the rider. In other words, most bicycles were not provided with any front or rear suspension.

Recently, bicycles, especially mountain bikes (MTB) and all terrain bikes (ATB), have been outfitted with front and/or rear suspension assemblies to absorb the shocks transmitted to the rider when riding on a rough road. These suspension assemblies range from very simple to very complex. However, these prior art suspension assemblies have many drawbacks to them. For example, some of the prior suspension assemblies are expensive to manufacture and/or difficult to assemble. Some prior art suspension assemblies require constant adjustments. Other suspension assemblies have adverse affects on the drive train.

Examples of some prior art bicycles utilizing rear suspension assemblies are disclosed in the following U.S. Pat. Nos.: 3,942,821 to Block; 5,121,937 to Lawwill; 5,205,572 to Buell et al.; 5,217,241 to Girvin; 5,226,674 to Buell et al.; 5,244,224 to Busby; 5,259,637 to Busby; 5,284,354 to McWethy; 5,306,036 to Busby; 5,316,327 to Bell; 5,332,246 to Buell; 5,354,085 to Gally; 5,370,411 to Takamiya et al.; 5,385,361 to De Bei; 5,409,249 to Busby; 5,460,396 to Sutter et al.; 5,474,318 to Castellano; 5,498,013 to Hwang; 5,570,896 to Collins; and 5,611,557 to Farris et al.

In view of the above, there exists a need for a bicycle suspension assembly which is relatively inexpensive and easy to manufacture. This invention addresses this need in the art as well as other needs in the art which will become apparent to those skilled in the art from this disclosure.

SUMMARY OF THE INVENTION

One object of the present invention is to provide a bicycle suspension assembly which is relatively inexpensive to manufacture.

Another object of the present invention is to provide a bicycle suspension assembly which pivotally supports the rear wheel of the bicycle for pivotal movement about the main axis of the bottom bracket.

Still another object of the present invention is to provide a two-piece bicycle frame which is relatively inexpensive to manufacture and includes a bicycle suspension assembly.

Still another of the object of the present invention is to provide a bicycle frame with a suspension assembly for supporting a rear wheel.

The foregoing objects can basically be attained by a bicycle suspension assembly, comprising a first suspension member having a first frame connection to be coupled to a first bicycle frame member; a second suspension member movably coupled to the first suspension member for relative pivotal movement about a pivot axis, the second suspension member having a second frame connection to fixedly couple a second bicycle frame member thereto and a bore sized to receive a bicycle crank axle therein such that the bicycle crank axle has its axis of rotation substantially coincident with the pivot axis; and a shock absorbing element coupled between the first suspension member and the second suspension member to bias the second suspension member from a shock absorbing position in which the shock absorbing element is substantially elastically deformed and a rest position in which the shock absorbing element is in relative equilibrium.

The foregoing objects can further be attained by a bicycle frame, comprising a first bicycle frame member having a front pivot end and a rear hub mounting end; and a bicycle suspension assembly coupled to the front pivot end of the first bicycle frame member via a first frame connection, the bicycle suspension assembly including a first suspension member having a second frame connection to be fixedly coupled to a second bicycle frame member, a second suspension member fixedly coupled to the front pivot end of the first bicycle frame member for movement therewith about a pivot axis and movably coupled to the first suspension member for relative pivotal movement about the pivot axis, the second suspension member having a bore sized to receive a bicycle crank axle therein such that the bicycle crank axle has its axis of rotation substantially coincident with the pivot axis, and a shock absorbing element coupled between the first suspension member and second suspension member to bias the second suspension member and the first bicycle frame member about the pivot axis from a shock absorbing position in which the shock absorbing element is substantially elastically deformed and a rest position in which the absorbing element is in relative equilibrium.

Moreover, the foregoing objects can also be attained by a bicycle frame, comprising a first bicycle frame member having a front fork connection and rear drive train connection; a second bicycle frame member having a front pivot end and a rear hub mounting end; and a bicycle suspension assembly coupled to the rear drive train connection of the first bicycle connection and coupled to the front pivot end of the second bicycle frame, the bicycle suspension assembly including a first suspension member having a first frame connection to be fixedly coupled to the rear drive train connection of the first bicycle frame member, a second suspension member fixedly coupled to the front pivot end of the second bicycle frame member for movement therewith about a pivot axis and movably coupled to the first suspension member for relative rotational movement about the pivot axis, the second suspension member having a bore sized to receive a bicycle crank axle such that the bicycle crank axle has its axis of rotation substantially coincident with the pivot axis, and a shock absorbing element coupled between the first suspension member and second suspension member to bias the second suspension member and the second bicycle frame member about the pivot axis from a shock absorbing position in which the shock absorbing element is substantially elastically deformed and a rest position in which the shock absorbing element is in relative equilibrium.

Other objects, advantages and salient features of the present invention will become apparent to those skilled in the art from the following detailed description, which, taken in conjunction with the annexed drawings, discloses two preferred embodiments of the present invention.

BRIEF DESCRIPTION OF THE DRAWINGS

Referring now to the attached drawings which form part of this original disclosure.

DETAILED DESCRIPTION OF THE PREFERRED EMBODIMENTS

Figure 1:
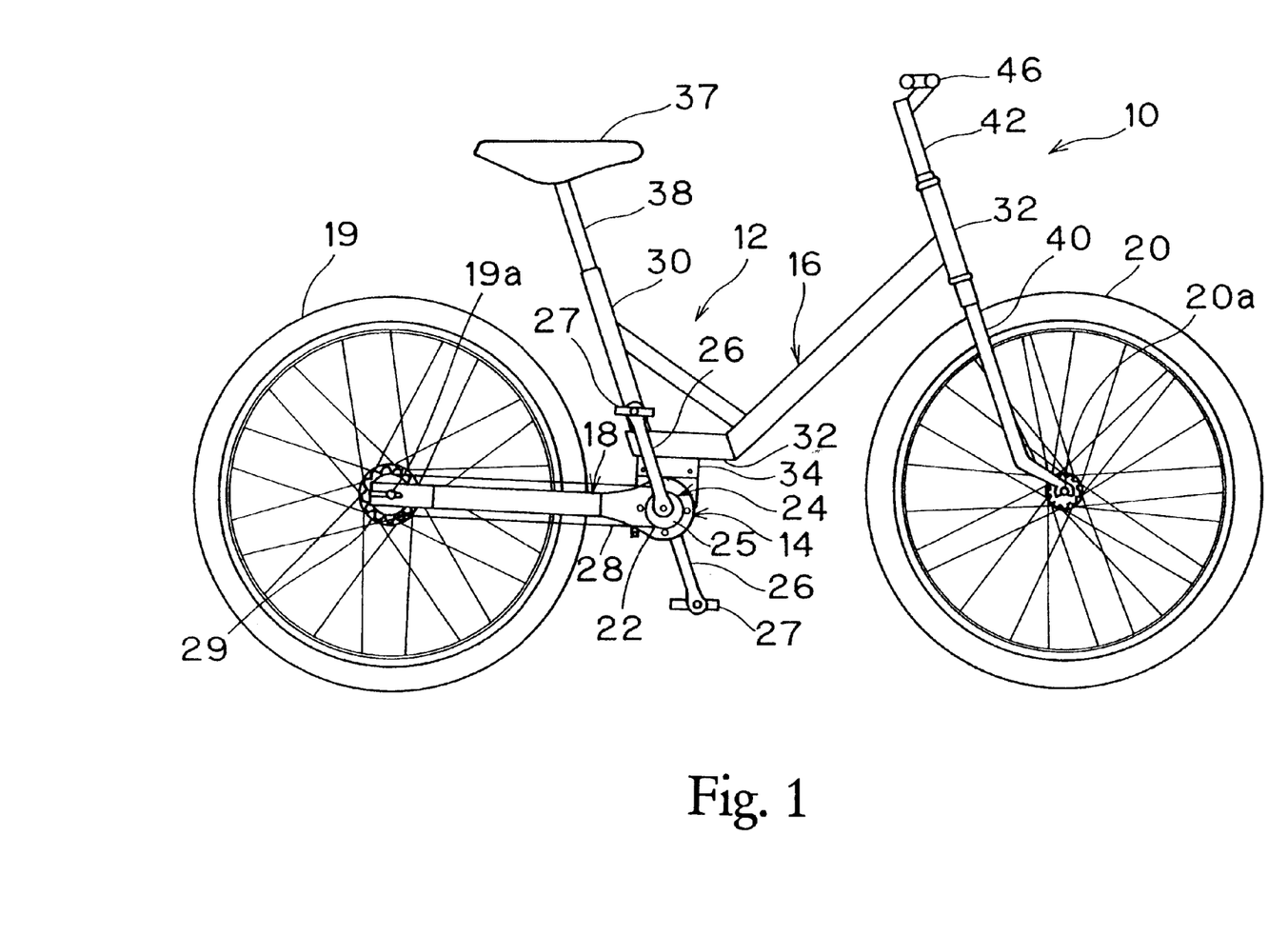
FIG. 1 is a side elevational view of a bicycle in accordance with the present invention which incorporates a two-piece bicycle frame with a rear suspension assembly.
Figure 2:
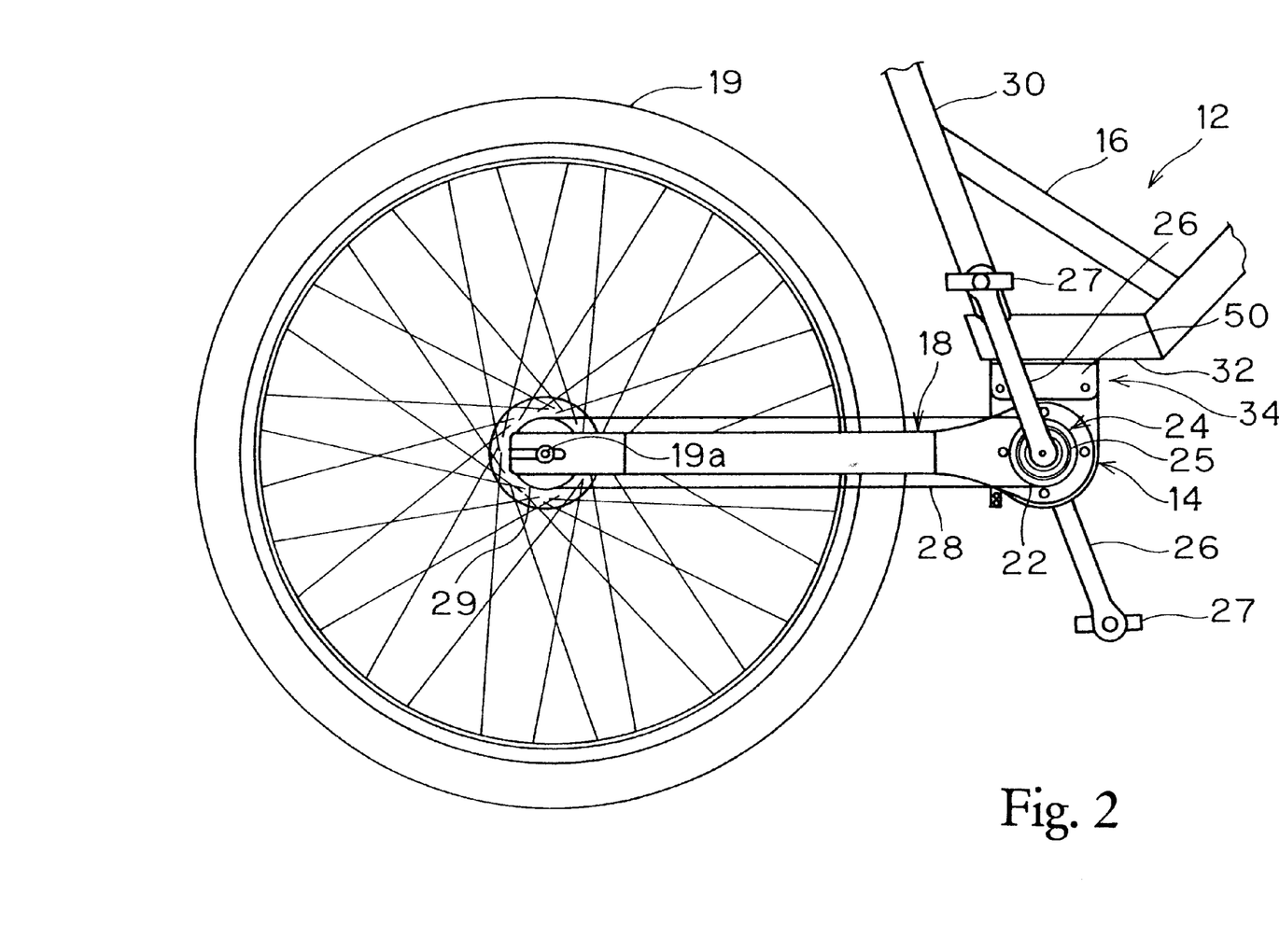
FIG. 2 is an enlarged, partial side elevational view of the bicycle frame illustrated in FIG. 1, illustrating the interconnection between the main frame member and the rear frame member.

Referring initially to FIGS. 1 and 2, a bicycle 10 with a frame 12 and a suspension assembly 14 is illustrated in accordance with the present invention. Frame 12 is basically a two-piece frame assembly with a first or main frame member 16 and a second or rear frame member 18 with suspension assembly 14 elastically coupling rear frame member 18 to main frame member 16 to absorb shocks transmitted thereto.

Bicycle 10 further includes a rear wheel 19 rotatably coupled about rear hub 19a, a front wheel 20 rotatably coupled about front hub 20a and a drive train assembly 22 for propelling bicycle 10. Drive train assembly 22 basically includes a bottom bracket 23, a crank set 24 with a front chain ring or sprocket 25, a pair of crank arms 26 with pedals 27, a drive chain 28 and a rear sprocket 29 coupled to the rear hub 19a of the rear wheel 19 in a conventional manner. Since these parts of bicycle 10 are well known in the art, these parts will not be discussed or illustrated in detail herein, except as they are modified to be used in conjunction with the present invention. Moreover, various conventional bicycle parts such as brakes, derailleurs, additional sprocket, etc., which are not illustrated and/or discussed herein, can be used in conjunction with the present invention.

In the embodiment illustrated herein, main frame member 16 is constructed of a plurality of rigid, tubular members, which are fixedly coupled and includes a seat connection 30, a front fork connection 32 and a rear drive train connection 34. Main frame member 16 is preferably constructed from a rigid material such as steel, a chrome molly alloy, a carbon composite material or other known suitable framing materials.

Seat connection 30 preferably conventionally couples seat 37 to main frame member 16 via a seat post 38 in a conventional manner. In particular, seat post 38 is preferably telescopically received within the framing tube which forms seat connection 30. The seat post 38 is held in the desired position by a conventional seat post bolt. Preferably, the seat post bolt is a quick released type bolt.

Front fork connection 32 preferably telescopically receives both front forks 40 and handlebar stem 42 in a conventional manner. Front forks 40 rotatably supports front wheel 20 via front hub 20a, while handlebar stem 42 supports handlebar 46 in a conventional manner for pivoting front forks 40 to steer bicycle 10.

Rear drive train connection 34 preferably includes a pair of brackets 50 which are welded to one of the tubular members forming main frame member 16. Brackets 50 extend downwardly from main frame member 16 and are spaced apart from each other to form a space for receiving part of suspension assembly 14 therein. Suspension assembly 14 is designed to be received between brackets 50 and then bolted thereto via bolts 56 and nuts 58. In particular, each bracket 50 has a pair of bolt holes 54 for receiving bolts 56 therethrough. Bolts 56 have threaded free ends which receive nuts 58 thereon. Accordingly, bolts 56 and nuts 58 fasten suspension assembly 14 to brackets 50 such that main frame member 16 can be easily disassembled from suspension assembly 14 and rear frame member 18 by merely removing bolts 56 and nuts 58. More specifically, suspension assembly 14 is designed to be received between brackets 50 and then bolted thereto via bolts 56 and nuts 58.

Figure 4:
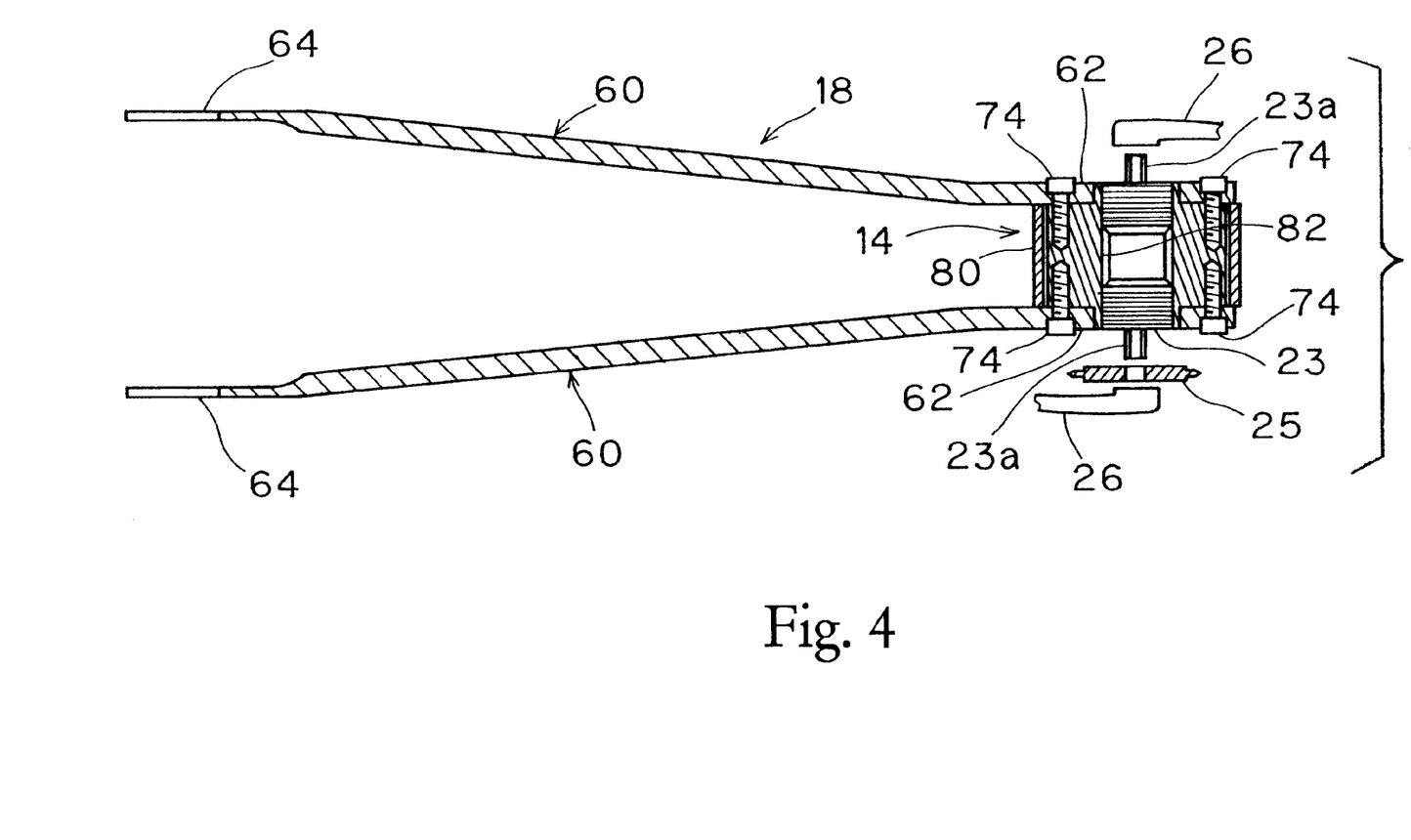
FIG. 4 is a transverse, cross-sectional view of the suspension assembly and the rear frame member with the bottom bracket and the mounting bolts being shown in elevation and with the front sprocket and crank arms exploded outwardly therefrom.

As best seen in FIG. 4, rear frame member 18 includes a pair of substantially identical arms 60. Each arm 60 has a front pivot end 62 which is fixedly coupled to part of bicycle suspension assembly 14, as discussed below, and a rear hub mounting end 64 which is coupled to the rear hub 19a of bicycle wheel 19 such that bicycle wheel 19 can rotate about rear hub 19a between arms 60 of rear frame member 18. Arms 60 are preferably constructed of a rigid material such as aluminum, steel, a chrome molly alloy, a carbon composite material or any other suitable framing type material.

Figure 6:
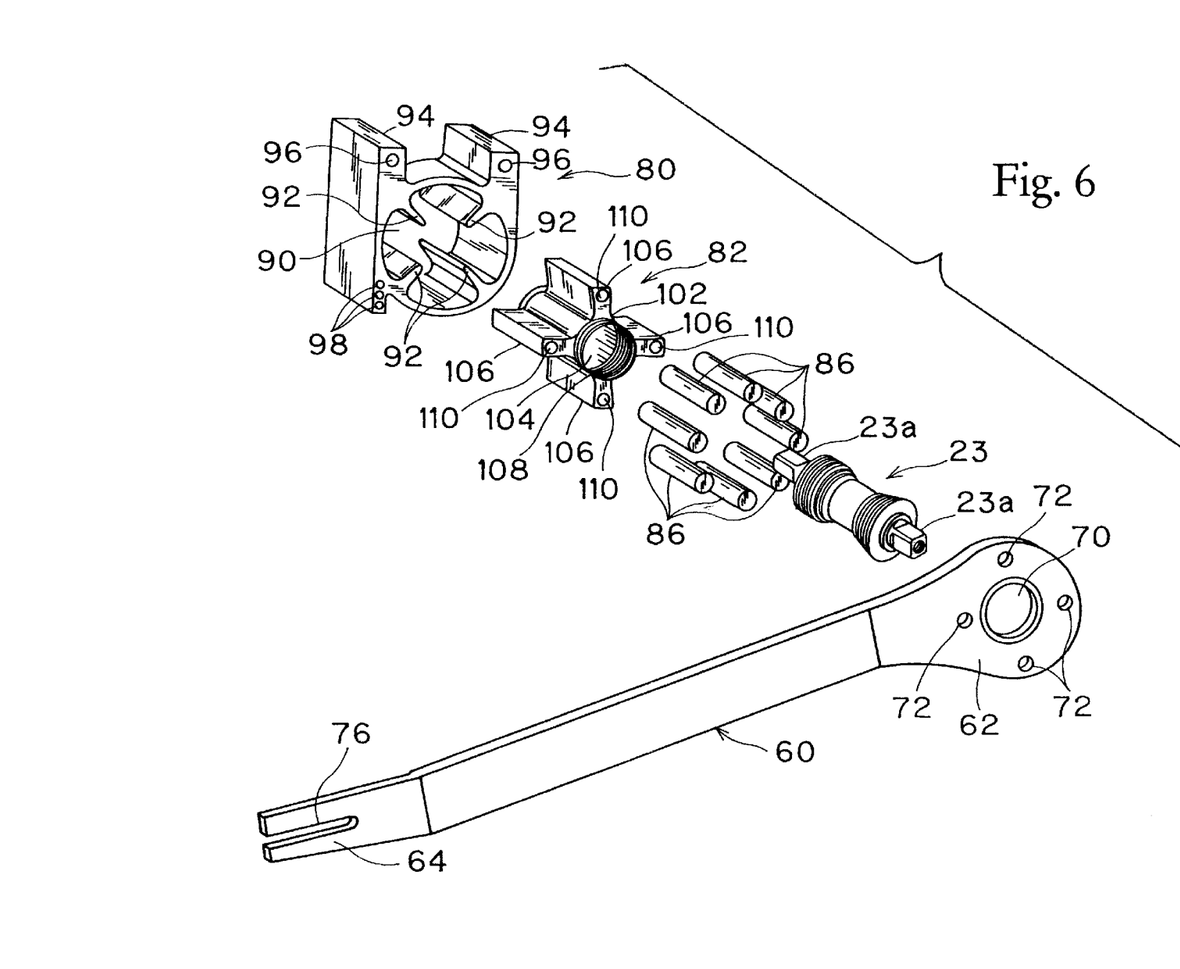
FIG. 6 is an exploded perspective view of the suspension assembly illustrated in FIGS. 1–5 with one of the arms of the rear frame member exploded outwardly therefrom.

Referring now to FIG. 6 in which the right arm 60 is illustrated. The front pivot end 62 of each arm 60 has a center opening 70 for receiving bottom bracket 23 therethrough, and four bolt holes 72 for receiving bolts 74 to fixedly couple its front pivot end 62 to a part of suspension assembly 14 as discussed below. Rear hub mounting end 64 has a longitudinally extending slot 76 which is designed to receive the threaded posts of the rear hub 19a to fixedly couple rear hub 19a thereto in a conventional manner. Since rear hubs and bicycle wheels such as rear hub 19a and wheel 19 are well known in the art, these parts will not be discussed or illustrated in detail herein.

Figure 3:
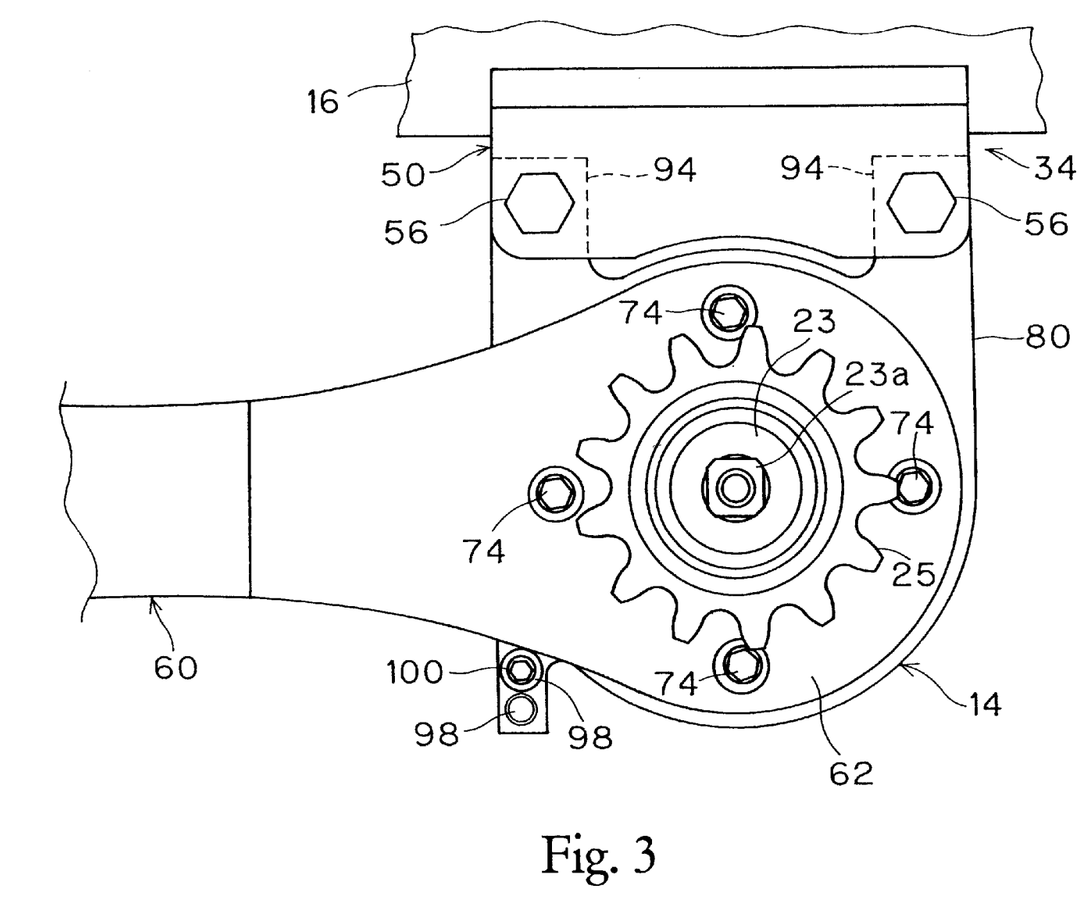
FIG. 3 is an enlarged partial side elevational view of the suspension assembly interconnected between the main frame member and the rear frame member with certain parts removed for purposes of illustration.
Figure 5:
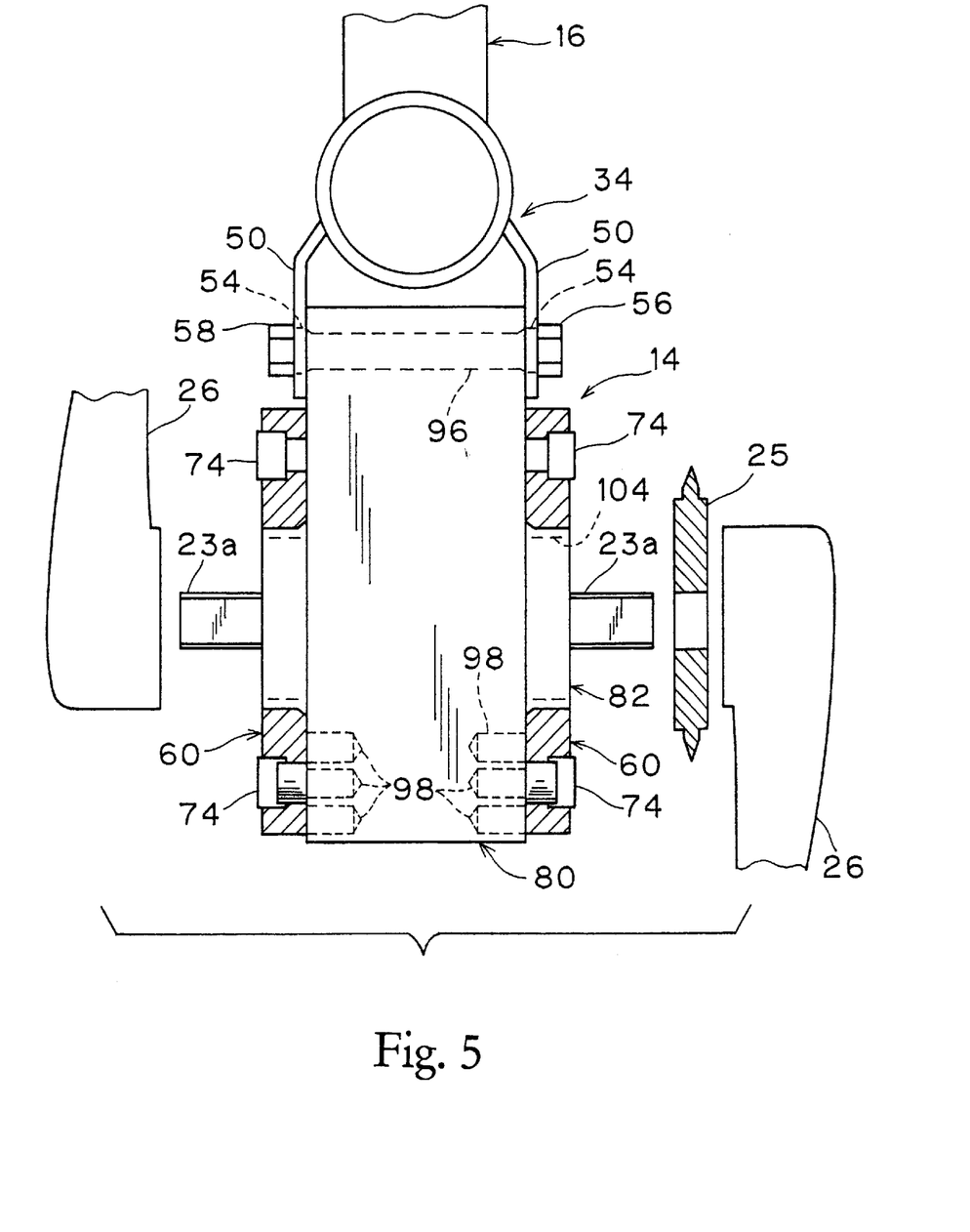
FIG. 5 is a rear elevational view of the suspension assembly with the front sprocket and crank arms exploded outwardly therefrom and the arms of the rear frame member being shown in cross section.
Figure 7:
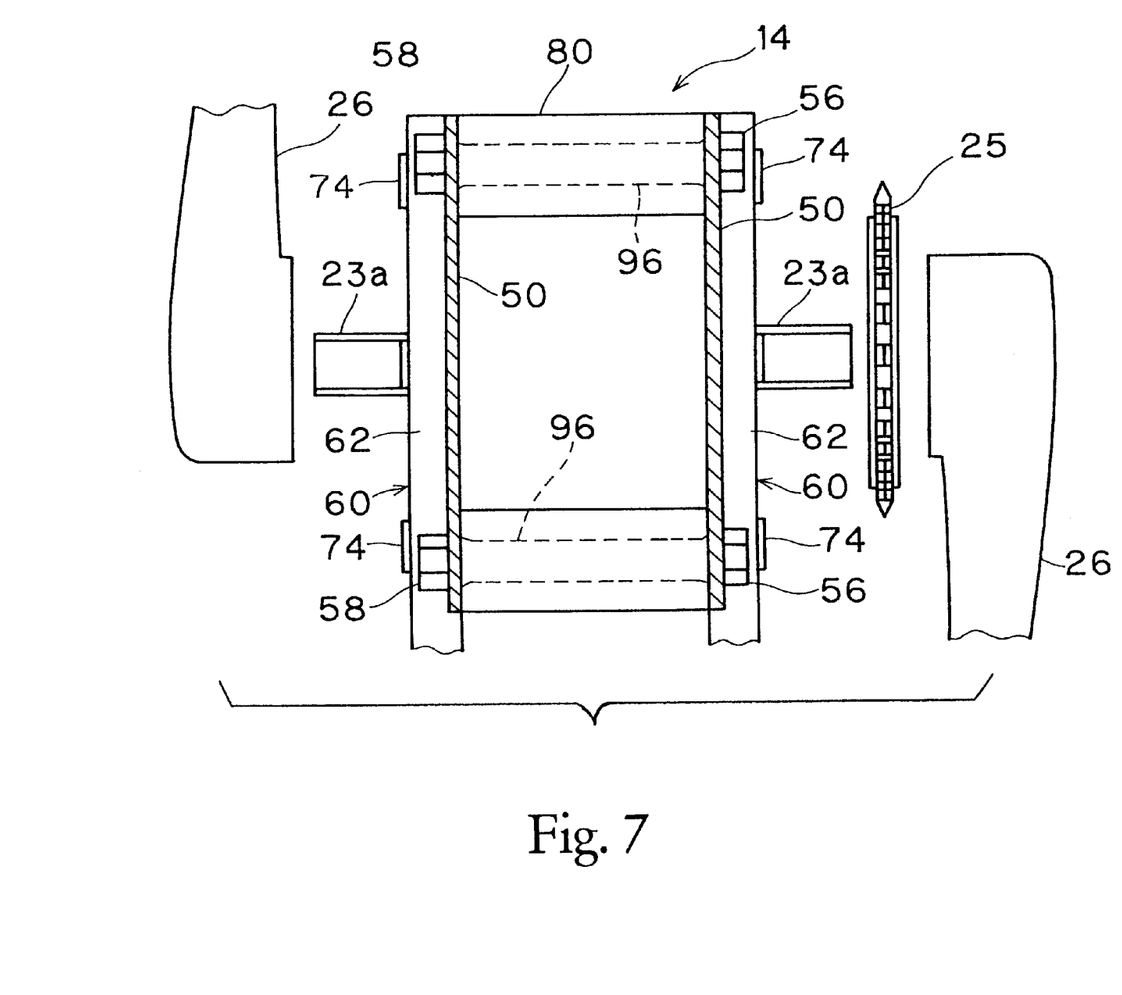
FIG. 7 is a top plan view of the suspension assembly illustrated in FIGS. 1–6 with the front sprocket and crank arms exploded outwardly therefrom.
Figure 8:
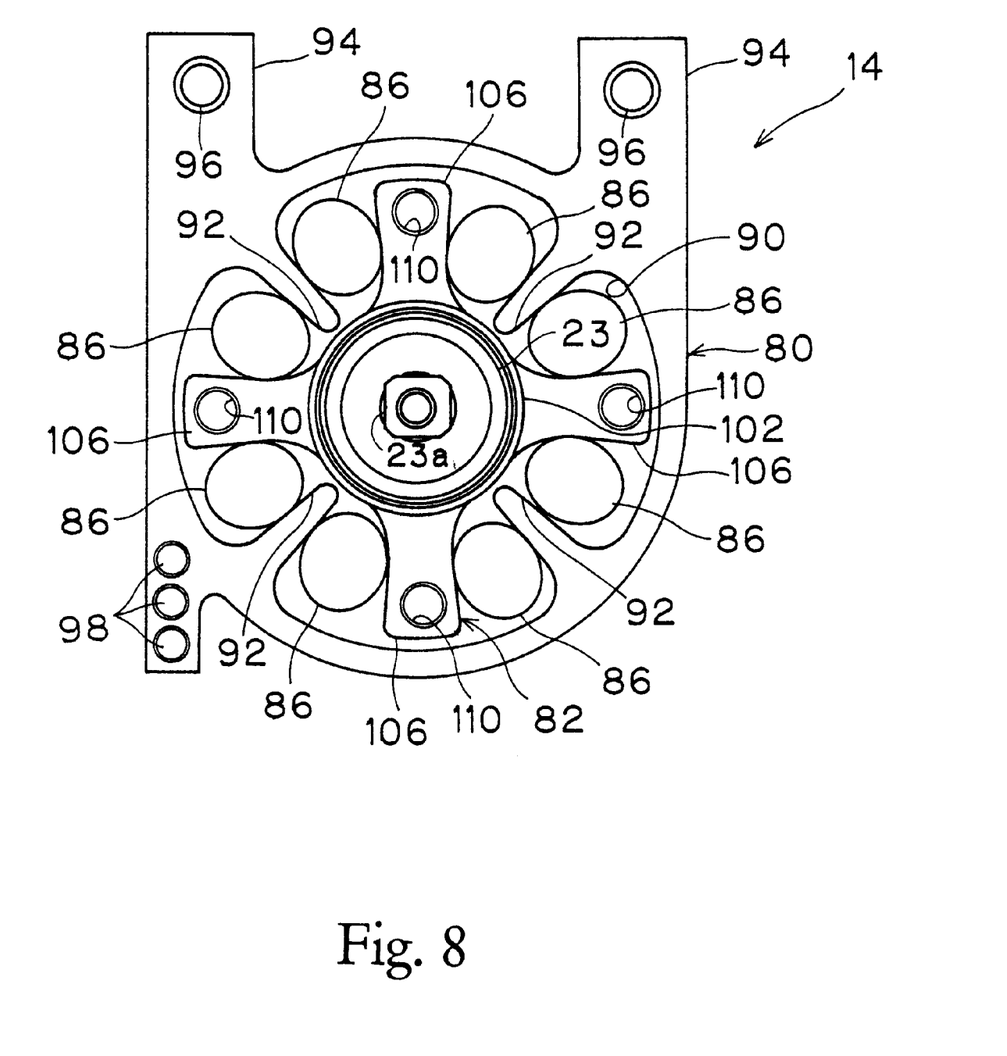
FIG. 8 is a side elevational view of the suspension assembly in its rest position and with the bottom bracket installed therein.

Referring now to FIGS. 3–8, suspension assembly 14 basically includes a first or outer suspension member 80, a second or inner suspension member 82 and a shock absorbing element, which in the present embodiment includes a plurality of biasing members 86 as best seen in FIGS. 6 and 8. Basically, first or outer suspension member 80 is rigidly coupled to rear drive train connection 34 of main frame member 16, as seen in FIGS. 3, 5 and 7, while second or inner suspension member 82 is fixedly coupled to the front pivot ends 62 of arms 60 of rear frame member 18, as seen in FIGS. 3 and 4, with biasing members 86 allowing for relative pivotal movement between outer suspension member 80 and inner suspension member 82 to absorb shocks transmitted to frame 12, as seen in FIG. 8.

Figure 9:
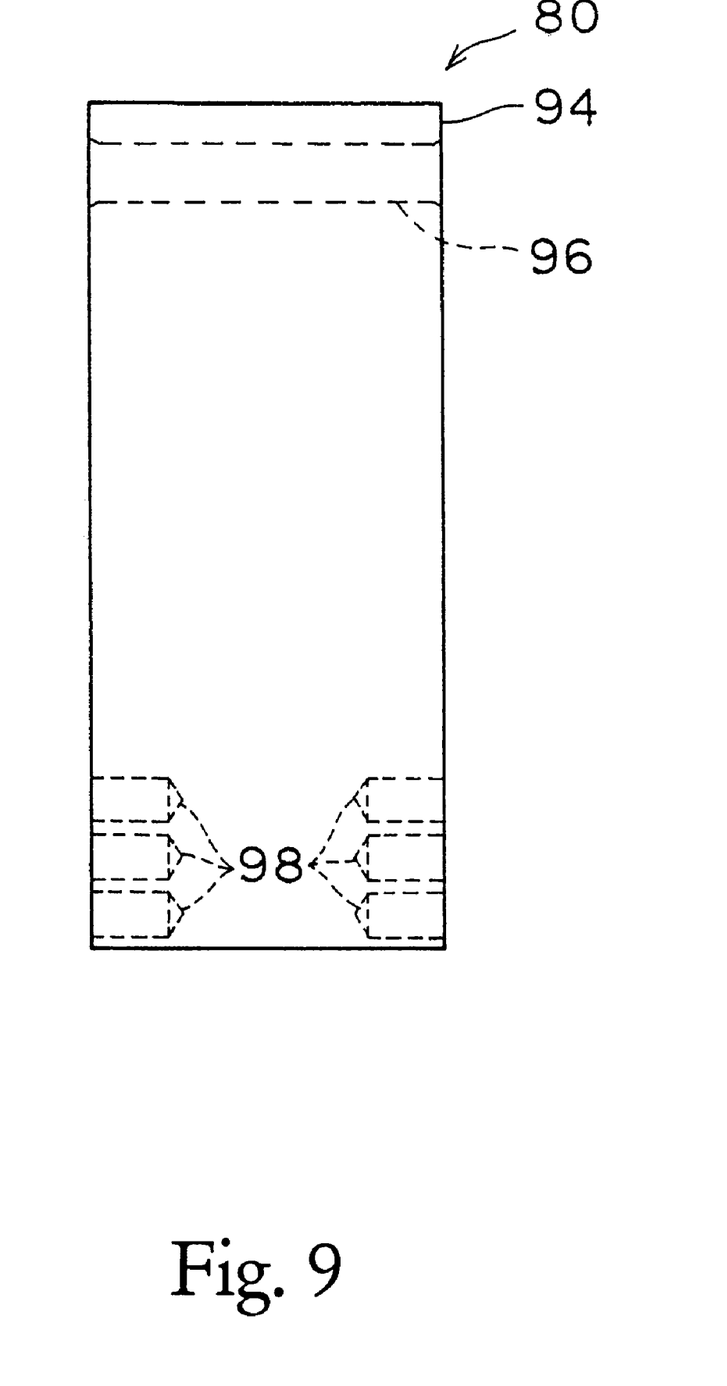
FIG. 9 is a rear elevational view of the outer suspension member for the suspension assembly illustrated in FIGS. 1–8.
Figure 10:
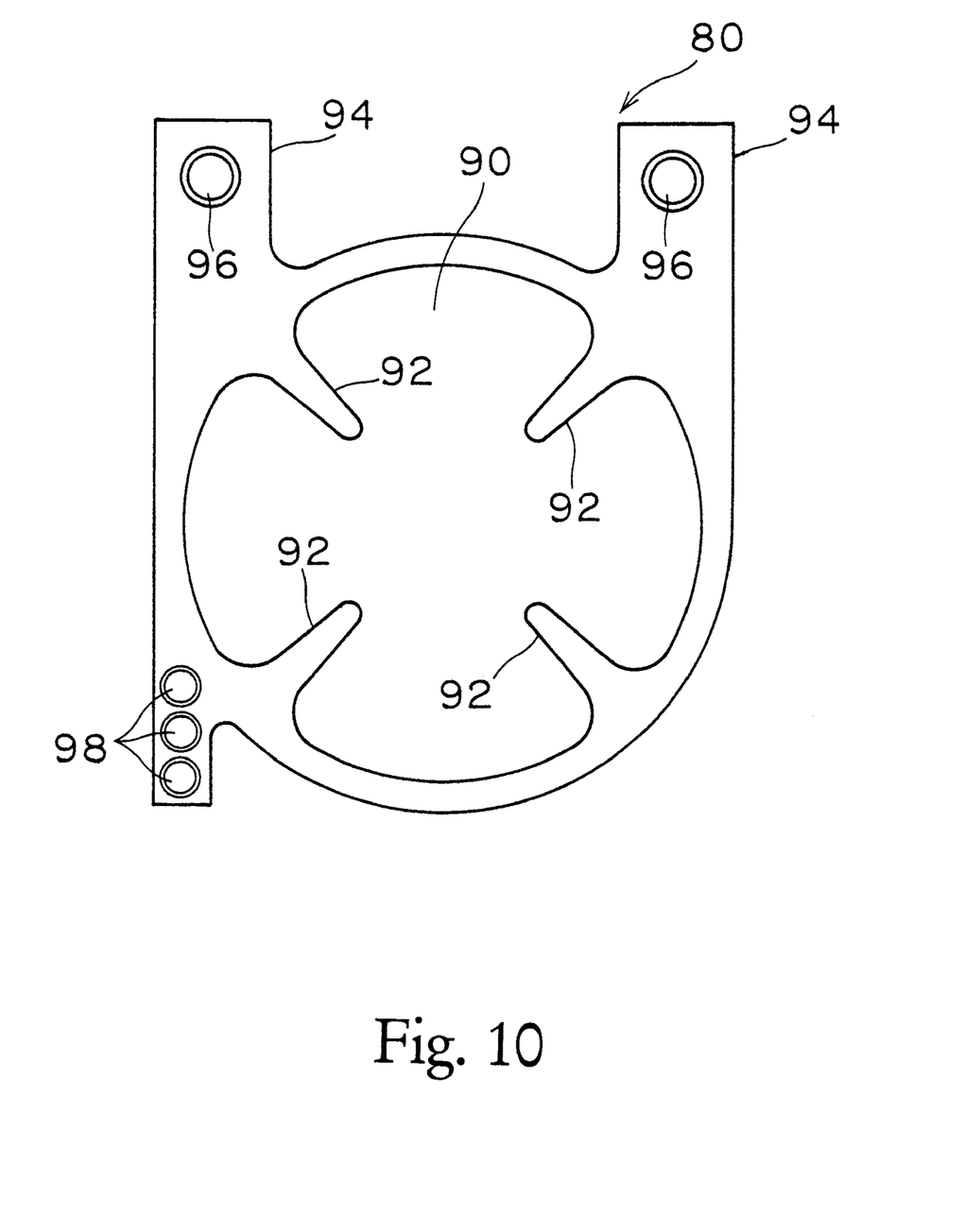
FIG. 10 is a side elevational view of the outer suspension member illustrated in FIG. 9 for the suspension assembly illustrated in FIGS. 1–8.
Figure 11:
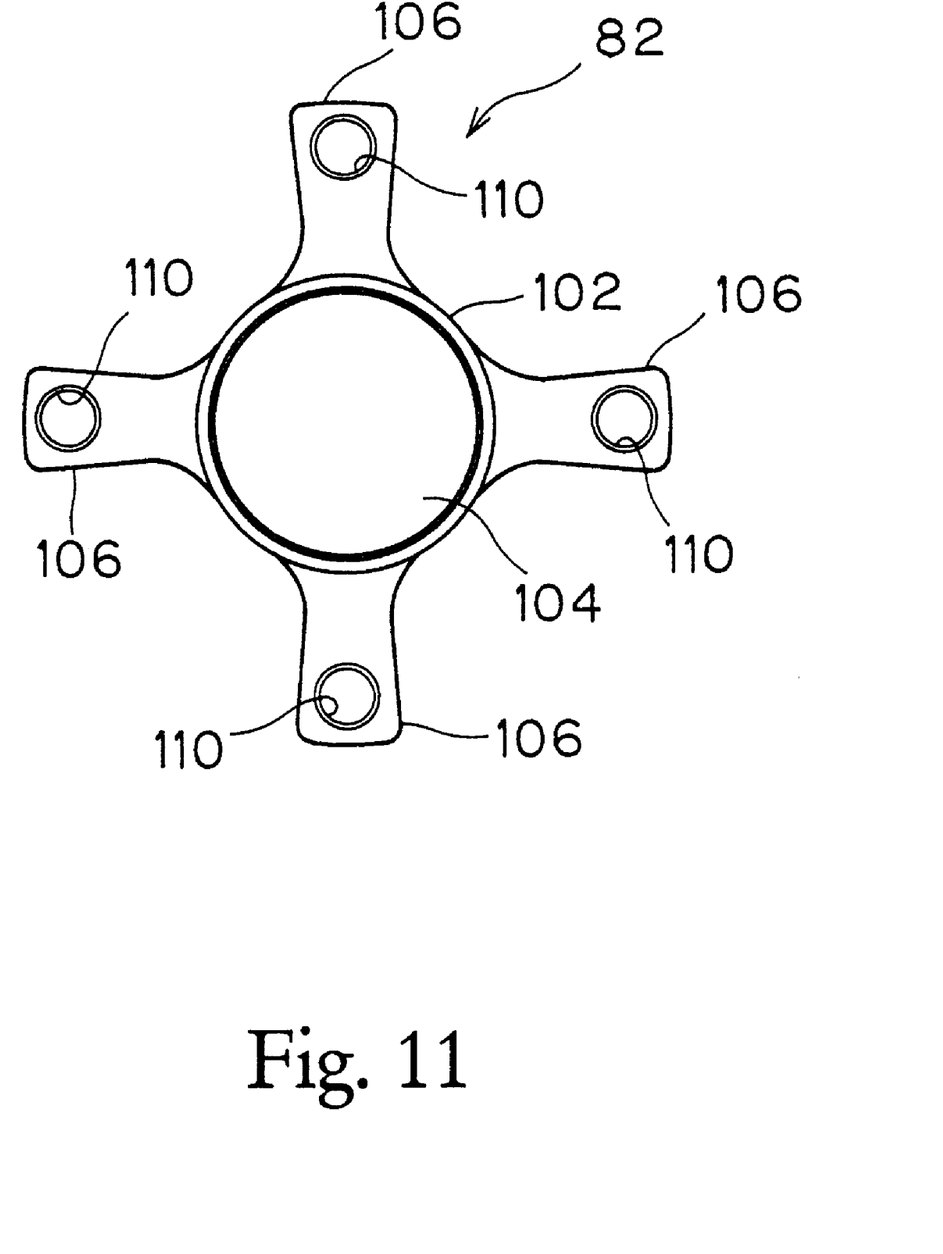
FIG. 11 is a side elevational view of the inner suspension member for the suspension assembly illustrated in FIGS. 1–8.
Figure 12:
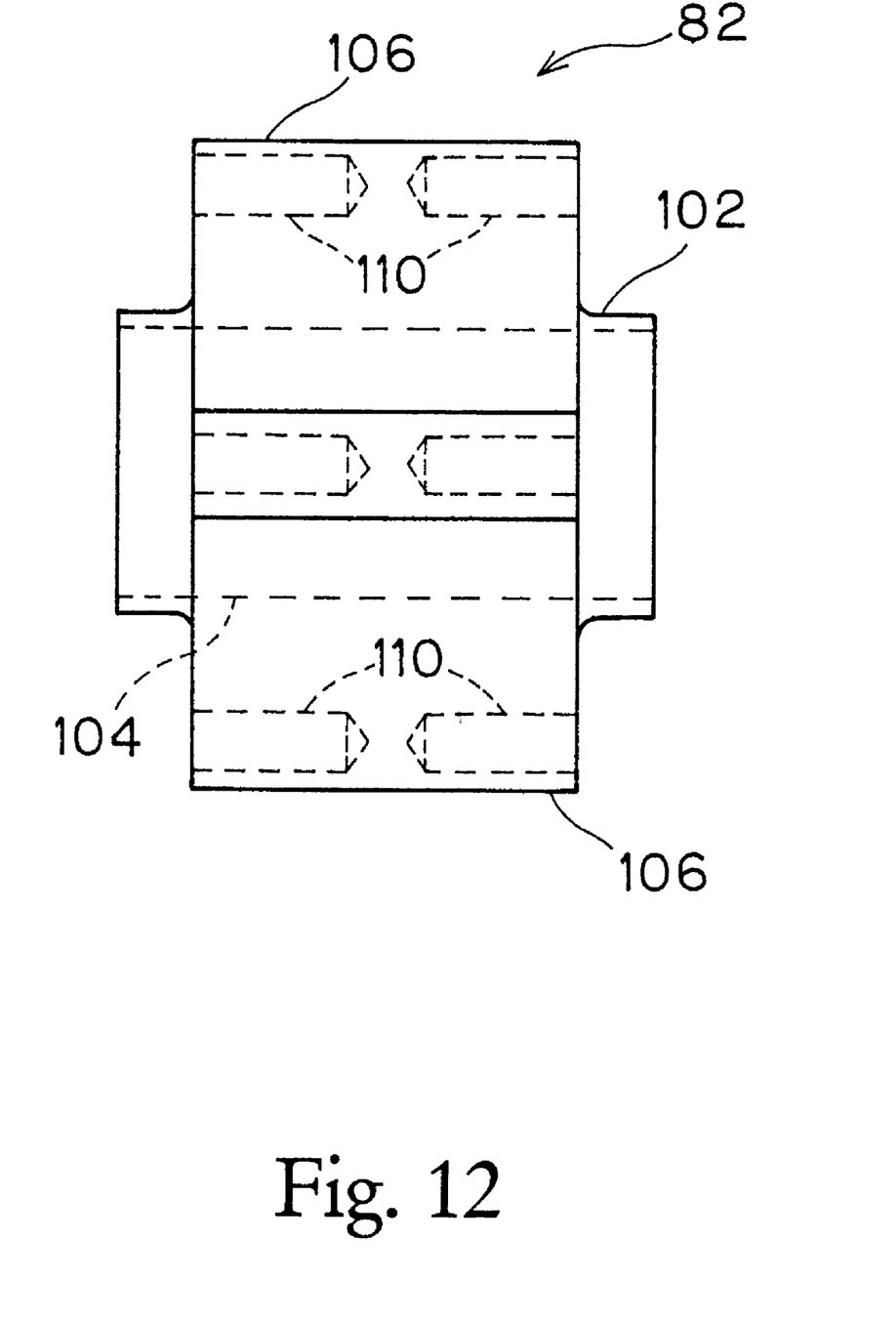
FIG. 12 is a rear elevational view of the inner suspension member illustrated in FIG. 11 for the suspension assembly illustrated in FIGS. 1–8.
Figure 13:
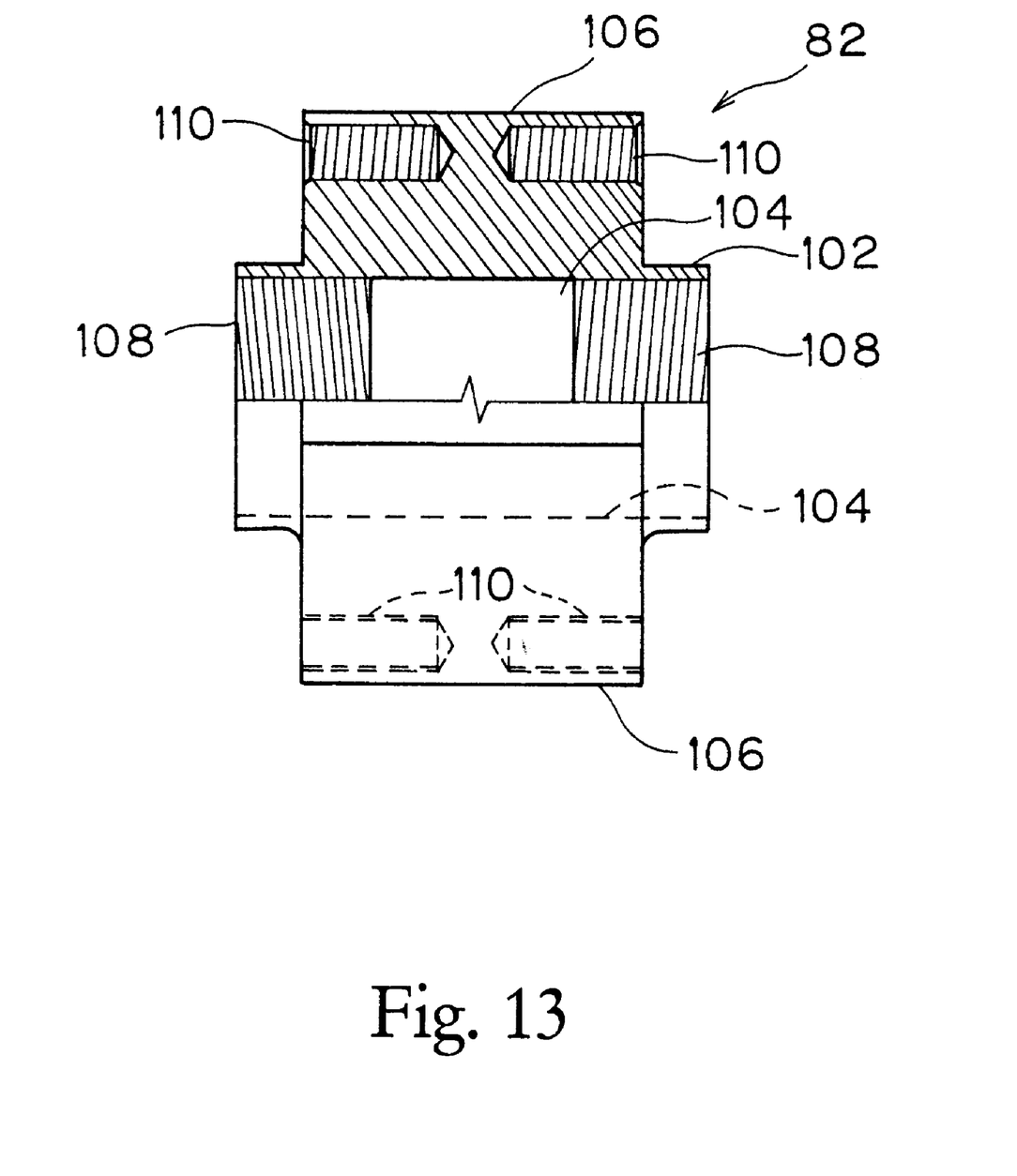
FIG. 13 is a partial cross-sectional view of the inner suspension member illustrated in FIGS. 11 and 12 for the suspension assembly illustrated in FIGS. 1–8.

As seen in FIGS. 8–10, outer suspension member 80 is constructed of a rigid material such as aluminum, steel, chrome molly alloy or other suitable materials. Outer suspension member 80 has a center opening 90 with its main longitudinal axis extending substantially transverse to the main longitudinal axis of the bicycle frame 12. Opening 90 is designed to receive inner suspension member 82 therein as well as bottom bracket 23 and biasing members 86, as seen in FIG. 8. Accordingly, the main longitudinal axis of opening 90 is axially aligned with the axis of bottom bracket 23. Opening 90 has four radially extending flanges or abutment members 92 which extend radially towards the center longitudinal axis of opening 90. These flanges or abutment members 92 each have a pair of oppositely facing abutment surfaces for engaging biasing members 86 as mentioned below.

As seen in FIGS. 6 and 7, outer suspension member 80 also has a pair of mounting members 94 with bolt holes 96 extending therethrough. Mounting members 94 form a main frame mounting connection for coupling suspension assembly 14 to main frame member 16 via bolts 56 and nuts 58. In particular, bolts 56 are inserted through bolt holes 54 of one of the brackets 50, and then through bolt holes 96 of outer suspension member 80, and then finally through the other two bolt holes 54 in the other of the two brackets 50. Finally, nuts 58 are threaded onto the threaded free ends of bolts 56 to fixedly secure outer suspension member 80 to main frame member 16.

As seen in FIGS. 8–10, outer suspension member 80 also preferably has a set of threaded holes 98 located on each face of outer suspension member 80 at its lower end. As seen in FIGS. 3 and 5, threaded holes 98 are designed to receive bolts 100 such that biasing members 86 are preloaded. More specifically, bolts 100 restrict the clockwise rotation of arms 60 of rear frame member 18 in the counterclockwise direction as seen in the figures. When a bolt 100 is positioned in the uppermost threaded hole 98, the biasing members 86 are preloaded to their maximum preload value as provided by the illustrated embodiment. By moving the bolts 100 to one of the lower sets of threaded holes 98, the amount of preload on biasing members 86 can be lowered. Of course, it will be apparent to those skilled in the art from this disclosure that bolts 100 can be completely removed such that biasing members 86 are not preloaded.

Referring now to FIGS. 8 and 11–13, second or inner suspension member 82 has a hub portion 102 with a center bore 104 extending therethrough and four flanges or abutment members 106 extending radially outwardly from hub portion 102. Center bore 104 is preferably sized to receive bottom bracket 23 therein in a conventional manner. In particular, each end of center bore 104 has threads 108 for threadedly receiving bottom bracket 23. Of course, it will be apparent to those skilled in the art that center bore 104 can be of other types of constructions for other types of bottom brackets or members which will rotatably support the bicycle crank axle 23a therein.

As best seen in FIG. 8, inner suspension member 82 is received within center opening 90 of outer suspension member 80 such that flanges 106 of inner suspension member 82 is positioned between flanges 92 of outer suspension member 80 with biasing members 86 interposed between adjacent flanges 92 and 106. The flanges or abutments 106 preferably have a pair of oppositely facing abutment surfaces for engaging the biasing members 86 when inner suspension member 82 is positioned within center opening 90 of outer suspension member 80. Each of the flanges 106 has a threaded hole 110 for receiving bolts 74 to fixedly couple arms 60 to each side of inner suspension member 82. Since inner suspension member 82 is fixedly coupled to arm 60 of rear frame member 18, inner suspension member 82 and rear frame member 18 will move together relative to main frame member 16 and outer suspension member 80 which are fixedly coupled together as mentioned above. Of course, the amount of rotational or pivotal movement between outer suspension member 80 and inner suspension member 82 is limited by the compression of biasing members 86.

Referring again to FIGS. 6 and 8, biasing members 86 are preferably elastomeric members which are sized and shaped to be received between flanges 92 of outer suspension member 80 and flanges 106 of inner suspension member 82 such that no relative movement occurs between outer suspension member 80 and inner suspension member 82 without biasing members 86 being deformed. During normal use, biasing members 86 should have sufficient resiliency to be elastically deformed to absorb shocks transmitted to framed 12 and to spring back to their normal rest positions. As seen in FIG. 6, biasing members 86 are cylindrical members having a circular cross-section. Of course, biasing members 86 can have a wide variety of shapes depending on the shapes of the other components of suspension assembly 14. Preferably, biasing members 86 are sized such that they are slightly deformed in their rest positions to prevent any relative movement between outer suspension member 80 and inner suspension member 82. While a plurality of biasing members 86 are used to form the shock absorbing element of the illustrated embodiment, it will be apparent to those skilled the in the art from this disclosure that the shock absorbing element could be constructed of a single elastomeric element, a single spring, a plurality of springs, etc. In other words, it will be apparent to those skilled in the art that the appended claims should not be limited to the shock absorbing element illustrated herein.

In operation, when a force or a shock is transmitted to the rear wheel 19, rear frame member 18 together with inner suspension member 82 will rotate in a clockwise direction about the main axis of bottom bracket 23. Since the absorption of this force or shock is compensated for by rotation about the axis of bottom bracket 23, there will be no affect on the chain 28, i.e., the chain 28 will not loosen or tighten during the rotational movement of the rear frame member 18 with respect to the main frame member 16. During this absorption of the shock or force to the bicycle 10, alternate biasing members 86 will be elastically deformed or compressed between flanges 92 and 106. Once the force or shock on the frame 12 is relieved, biasing members 86 will spring back to their rest positions which in turn will move the inner suspension member 82 relative to the outer suspension member 80 to their initial rest positions due to the resiliency of biasing members 86. In their initial rest positions, alternating biasing members 86 can be initially compressed or preloaded in the clockwise direction by threading a pair of bolts 100 into the threaded holes 98 in the outer suspension member 80. In other words, in the rest positions, bolts 100 engage arms 60 to hold arms 60 in a position in which alternate biasing members 86 are slightly compressed or preloaded in the clockwise direction.

Second Embodiment

Figure 14:
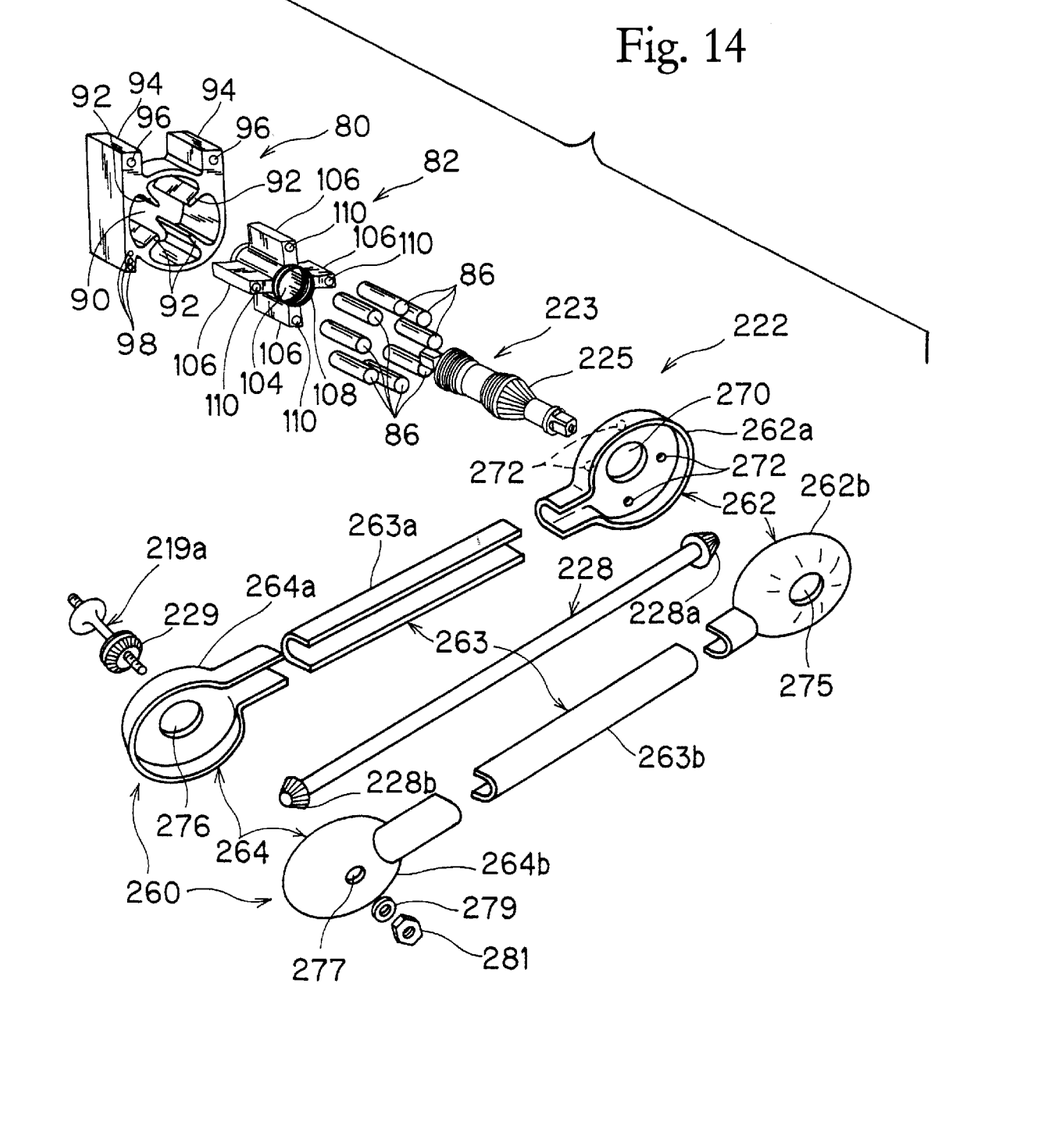
FIG. 14 is an exploded perspective view of the suspension assembly illustrated in FIGS. 1–7 used in conjunction with a modified rear frame member and drive train assembly in accordance with a second embodiment of the present invention.

Referring now to FIG. 14, a second embodiment of the present invention is illustrated. This second embodiment differs from the first embodiment in that drive train assembly 222 is a shaft drive assembly, while drive train assembly 22 of the first embodiment, as discussed above, is a chain drive type mechanism. More specifically, the second embodiment is substantially identical to the first embodiment, discussed above, except that the right arm 60 of rear frame member 18, bottom bracket 23, front sprocket 25, drive chain 28 and rear sprocket 29 have been replaced with right arm 260, bottom bracket 223, front gear 225, drive shaft 228 and rear gear 229.

In view of the similarities between the two embodiments, only the main differences between the second embodiment and the first embodiment will be illustrated herein. Moreover, since the second embodiment utilizes many of the same parts as are used in the first embodiment, these parts will be given the same reference numeral as in the first embodiment.

In this second embodiment, rear frame member 218 includes the first or left arm 60 as discussed above in the first embodiment and a second or right arm 260 as seen in FIG. 14. Right arm 260 basically includes a front end housing 262, a center housing 263 and a rear hub housing 264. Housings 262, 263 and 264 are all constructed of substantially rigid bicycle framing materials which are known in the art. For example, housings 262, 263 and 264 can be made of aluminum, chrome molly alloy, etc. Housing 262, 263 and 264 are each rigidly fastened together to form a rigid support arm extending from suspension assembly 14 to rear hub 219*a*.

Front end housing 262 is preferably a two-piece housing which are rigidly coupled together. First part 262*a* of front end housing 262 is coupled to inner suspension member 82 via bolts 74 in substantially the same manner as right arm 60 of the first embodiment. In particular, part 262*a* of front end housing 262 has a center opening 270 for receiving the crank axle of bottom bracket 223 therethrough and four bolt holes 272 for receiving bolts 74 of the first embodiment to fixedly couple front end housing 262 to inner suspension member 82. Second part 262*b* of front end housing 262 has a center opening 275 such that the end of crank axle of bottom bracket 223 extends therethrough for attaching right crank arm 26 of the first embodiment.

Center housing 263 is also preferably a two-piece construction having a first part 263A rigidly coupled to a second part 263B to form a hollow tube. The first end of the hollow tube formed by center housing 263 is coupled to front end housing 262, while the second or rear end of the hollow tube formed by center housing 263 is coupled to rear hub housing 264 such that drive shaft 228 is positioned therein and extends between front end housing 262 and rear hub housing 264.

Rear hub housing 264 is also preferably a two-part construction with a first part 264*a* having a center opening 276 which is designed to receive the threaded post of the rear hub 219A therethrough as well as rear gear 229. The second part 264*b* of rear hub housing 264 has a center opening 277 which receives the threaded post of rear hub 219*a* therethrough for receiving a washer 279 and a nut 281 thereon for fixedly coupling rear hub housing 264 to rear hub 219*a*.

Drive shaft 228 has a first bevel gear 228*a* positioned in front end housing 262 for engaging bevel gear 225 which is fixedly coupled to the crank axle of bottom bracket 223. The other end of drive shaft 228 has with a rear bevel gear 228*b* for engaging rear bevel gear 229 of rear hub 219*a*. Accordingly, drive shaft 228 transmits power from bottom bracket 223 to rear hub 219*a*. More specifically, when the pedals of the bicycle are turned to rotate bottom bracket 223, front bevel gear 225 will rotate therewith. The teeth of front bevel gear 225 meshes with the teeth of bevel gear 228*a* to rotate drive shaft 228 which in turn rotates bevel gear 228*b*. The teeth of bevel gear 228*b* meshes with the teeth of rear bevel gear 229 for rotating rear hub 219*b*.

Similar to the first embodiment, the second embodiment has its left arm 60 and its right arm 260 rigidly coupled to inner suspension member 82 for rotation about the axis of bottom bracket 223. Therefore, when a force or shock is transmitted to the rear wheel 19, rear frame member 218 together with inner suspension member 82 will rotate in a clockwise direction about the main axis of bottom bracket 223. Since the absorption of this force or shock is compensated for by rotation about the axis of bottom bracket 223, there will be no adverse affect on drive shaft 228.

While only two embodiments of the present invention have been described and illustrated herein, it will be apparent to those skilled in the art once given this disclosure that various modifications, changes, improvements and variations may be made without departing from the spirit or scope of this invention as defined in the following claims.

What is claimed is:

1. A bicycle suspension assembly adapted to be coupled to a bicycle frame, comprising:

a first suspension member having a first frame connection adapted to be coupled to a bicycle frame member;

a second suspension member movably coupled to said first suspension member, said first and second suspension members having a pivot axis, said second suspension member having a second frame connection adapted to be fixedly coupled to a bicycle frame member, said second suspension member further having a bore sized to be adapted to receive a bicycle crank axle therein; and a shock absorbing element coupled between said first suspension member and said second suspension member to bias said second suspension member from a shock absorbing position in which said shock absorbing element is substantially elastically deformed and a rest position in which said shock absorbing element is in relative equilibrium, said shock absorbing element being substantially straight and extending in a direction parallel with said axis of rotation between said first suspension member and said second suspension member.

2. A bicycle suspension assembly according to claim 1, wherein said first suspension member has an opening with said second suspension member coaxially located therein for relative rotation about said pivot axis.

3. A bicycle suspension assembly according to claim 2, wherein said shock absorbing element is located within said opening.

4. A bicycle suspension assembly according to claim 1, wherein said first suspension member includes at least one first abutment and said second suspension member includes at least one second abutment with said shock absorbing element functionally engaging said first and second abutments.

5. A bicycle suspension assembly adapted to be coupled to a bicycle frame, comprising:

a first suspension member having a first frame connection adapted to be coupled to a bicycle frame member;

a second suspension member movably coupled to said first suspension member, said first and second suspension members having a pivot axis, said second suspension member having a second frame connection adapted to be fixedly coupled to a bicycle frame member, said second suspension member further having a bore sized to be adapted to receive a bicycle crank axle therein; and a shock absorbing element coupled between said first suspension member and said second suspension member to bias said second suspension member from a shock absorbing position in which said shock absorbing element is substantially elastically deformed and a rest position in which said shock absorbing element is in relative equilibrium, said first suspension member having an opening with said second suspension member coaxially located therein for relative rotation about said pivot axis, said first suspension member having first abutments extending inwardly into said opening, said second suspension member having second abutments extending outwardly therefrom, and said shock absorbing element including biasing members positioned between said first and second abutments to normally hold said first and second suspension members from moving until a torsional force is applied causing at least one of said biasing members to elastically deform.

6. A bicycle suspension assembly according to claim 5, wherein said first suspension member includes four of said first abutments and said second suspension member includes four of said second abutments, with one of said biasing members positioned between opposing surfaces of said first and second abutments.

7. A bicycle suspension assembly according to claim 6, wherein said biasing elements being constructed of an elastomeric material.

8. A bicycle suspension assembly according to claim 1, wherein said first frame connection includes bolt holes.

9. A bicycle suspension assembly according to claim 1, wherein said second frame connection includes bolt holes.

10. A bicycle suspension assembly according to claim 1, wherein said bore of said second suspension member is threaded.

11. A bicycle suspension assembly according to claim 1, wherein said first suspension member has a stop member.

12. A bicycle suspension assembly according to claim 5, wherein said first frame connection includes bolt holes.

13. A bicycle suspension assembly according to claim 5, wherein said second frame connection includes bolt holes.

14. A bicycle suspension assembly according to claim 5, wherein said bore of said second suspension member is threaded; and said first suspension member has a stop member.

15. A bicycle suspension assembly according to claim 5, wherein said biasing members are constructed of an elastomeric material.

* * * * *